(12) United States Patent
Lazaroff

(10) Patent No.: US 12,073,144 B2
(45) Date of Patent: Aug. 27, 2024

(54) COMPUTER INPUT FROM MUSIC DEVICES

(71) Applicant: David Isaac Lazaroff, Denver, CO (US)

(72) Inventor: David Isaac Lazaroff, Denver, CO (US)

(*) Notice: Subject to any disclaimer, the term of this patent is extended or adjusted under 35 U.S.C. 154(b) by 665 days.

(21) Appl. No.: 17/193,659

(22) Filed: Mar. 5, 2021

(65) Prior Publication Data

US 2021/0279028 A1    Sep. 9, 2021

Related U.S. Application Data

(60) Provisional application No. 62/986,108, filed on Mar. 6, 2020, provisional application No. 62/985,601, filed on Mar. 5, 2020.

(51) Int. Cl.
*G06F 3/16* (2006.01)
*G06F 3/01* (2006.01)
*G10H 1/00* (2006.01)

(52) U.S. Cl.
CPC .............. *G06F 3/162* (2013.01); *G06F 3/01* (2013.01); *G10H 1/0008* (2013.01); *G10H 2210/066* (2013.01); *G10H 2220/155* (2013.01)

(58) Field of Classification Search
CPC ......... G06F 3/162; G06F 3/01; G10H 1/0008; G10H 2210/066; G10H 2220/155
USPC ............................................................ 84/645
See application file for complete search history.

(56) References Cited

U.S. PATENT DOCUMENTS

| 5,440,071 A | * | 8/1995 | Johnson | G10H 1/38 84/645 |
| 5,902,949 A | * | 5/1999 | Mohrbacher | G10H 1/0008 84/645 |
| 6,156,965 A | * | 12/2000 | Shinsky | G10H 1/0058 84/657 |
| 6,156,966 A | * | 12/2000 | Shinsky | G10H 1/38 84/657 |
| 6,351,225 B1 | * | 2/2002 | Moreno | G06F 3/0219 84/744 |

(Continued)

FOREIGN PATENT DOCUMENTS

JP    2019207339 A  * 12/2019

OTHER PUBLICATIONS

Feit, Anna Maria; Oulasvirta, Antti; PianoText: Redesigning the Piano Keyboard for Text Entry; Conference: Conference on Designing Interactive Systems: Processes, Practices, Methods, and Techniques, DIS; Jun. 25, 2014; Vancouver, CA.

(Continued)

*Primary Examiner* — Christina M Schreiber

(57) ABSTRACT

A method for interfacing tones with a computer enables a music device to emulate the functions of a computer keyboard. The method includes receiving a digital signal representing one or more note events and identifying a group of concurrent notes from the one or more note events, wherein the one or more note events each have a pitch, a velocity and an initiation. In accordance with a pitch class of a base note of the group of notes and intervals computed between pitch classes of the notes of the group as ordered by the pitch of the note events, the group of notes are translated into a computer input signal representative of one or more keystrokes on a computer keyboard and the computer input signal is sent to a computer for output or further processing.

18 Claims, 5 Drawing Sheets

(56) References Cited

U.S. PATENT DOCUMENTS

| | | | | |
|---|---|---|---|---|
| 6,444,888 B1* | 9/2002 | VanDruff | | G10H 1/20 |
| | | | | 84/649 |
| 6,640,257 B1* | 10/2003 | MacFarlane | | G06F 3/162 |
| | | | | 84/625 |
| 6,740,802 B1* | 5/2004 | Browne, Jr. | | G10H 1/0041 |
| | | | | 84/622 |
| 7,215,328 B2* | 5/2007 | Sim | | G06F 3/021 |
| | | | | 361/679.19 |
| 8,354,580 B2* | 1/2013 | Bowen | | G06F 3/0221 |
| | | | | 84/718 |
| 8,426,713 B1* | 4/2013 | Sardo | | G10H 1/344 |
| | | | | 84/645 |
| 9,230,526 B1* | 1/2016 | Cook | | G10H 1/0058 |
| 10,102,767 B2* | 10/2018 | Bayadzhan | | G09B 15/023 |
| 10,262,643 B1* | 4/2019 | Kinter | | G10H 5/06 |
| 10,978,033 B2* | 4/2021 | Lathrop | | G10G 1/02 |
| 2004/0231500 A1* | 11/2004 | Sim | | G10H 1/34 |
| | | | | 84/719 |
| 2006/0150802 A1* | 7/2006 | Whiting | | G10H 1/386 |
| | | | | 84/603 |
| 2007/0227340 A1* | 10/2007 | Fallgatter | | G10H 1/0008 |
| | | | | 84/615 |
| 2008/0072738 A1* | 3/2008 | Plamondon | | G10G 1/00 |
| | | | | 84/423 R |
| 2014/0041513 A1* | 2/2014 | Abesser | | G10H 1/0008 |
| | | | | 84/622 |
| 2018/0061383 A1* | 3/2018 | Hovey | | G10H 1/0558 |
| 2020/0272408 A1* | 8/2020 | Rubin | | G06F 3/162 |
| 2021/0241734 A1* | 8/2021 | Williams | | G06Q 40/12 |
| 2021/0279028 A1* | 9/2021 | Lazaroff | | G06F 3/162 |
| 2022/0051647 A1* | 2/2022 | Chang | | G06F 3/162 |

OTHER PUBLICATIONS

Feit, Anna Maria; Oulasvirta, Antti; PianoText: Transferring Musical Expertise to Text Entry; Extended Abstracts on Human Factors in Computing Systems from Proceedings of the SIGCHI Conference on Human Factors in Computing Systems, 2013, Paris, FR; Association for Computing Machinery; New York, NY US.

* cited by examiner

COMPUTER INPUT FROM MUSIC DEVICES

CROSS REFERENCE TO RELATED APPLICATIONS

This application claims the priority benefit of U.S. Provisional Application No. U.S. 62/985,601, filed on Mar. 5, 2020 and U.S. 62/986,108, filed on Mar. 6, 2020 both of which are incorporated herein by reference in their entirety.

TECHNICAL FIELD

The disclosure relates human interface devices for computing and musical instrument practice.

BACKGROUND

Practice is required to become proficient at the motions and fingerings required to play musical instruments. Many people spend significant time typing on a computer for any of a variety of purposes including personal email, internet browsing, or hours of computer work at a job. Some people who spend significant time typing on a computer would like to spend more time practicing the fingerings of notes and chords (multiple notes played together) of a musical instrument and movements or transitions therebetween.

SUMMARY

The disclosure describes a method for interfacing music devices with a computer. The method includes receiving a digital signal representing one or more note events and identifying a group of concurrent notes from the one or more note events, wherein the one or more note events each have a pitch, a velocity and an initiation. The notes of the group of concurrent notes are sequentially ordered according to the pitch of each note, creating a sequence of notes wherein every two adjacent notes in the sequence constitutes a pair. In accordance with a pitch class to which a bass note of the group of concurrent notes belongs and intervals computed between pitch classes to which the two notes of each pair in the sequence of notes belong, the group of concurrent notes are translated into a computer input signal representative of one or more keystrokes on a computer keyboard and the computer input signal is sent to a computer for output or further processing.

Further, the disclosure describes a system for interfacing music devices with a computer. The system includes an input, an output and a microprocessor. The microprocessor is configured to receive, through the input, a digital signal representing one or more note events each having a pitch, a velocity and an initiation and to identify a group of concurrent notes from the one or more note events. The notes of the group of concurrent notes are sequentially ordered according to the pitch of each note, creating a sequence of notes wherein every two adjacent notes in the sequence constitutes a pair. In accordance with a pitch class to which a bass note of the group of concurrent notes belongs and intervals computed between pitch classes to which the two notes of each pair in the sequence of notes belong, the microprocessor is configured to translate the group of notes into a computer input signal representative of one or more keystrokes on a computer keyboard and send the computer input signal through the output to a computer for output or further processing.

Further still, the disclosure describes a method for interfacing tones with a computer. The method includes, from a musical instrument, receiving an analog signal representing one or more tones each having a pitch and a volume, identifying a group of concurrent tones of the one or more tones, ordering the tones of the group of concurrent tones by pitch into a sequence of tones wherein every two adjacent tones in the sequence constitutes a pair, and in accordance with a pitch class to which a bass tone of the group of concurrent tones belongs and intervals computed between pitch classes to which the two tones of each pair in the sequence of tones belong, translating the group of concurrent tones into a computer input signal representative of one or more keystrokes on a computer keyboard. The computer input signal is sent to a computer for output or further processing.

BRIEF DESCRIPTION OF THE FIGURES

The summary above, as well as the following detailed description of illustrative embodiments, is better understood when read in conjunction with the appended drawings. For the purposes of illustrating the disclosure, example constructions, implementations and/or embodiments are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
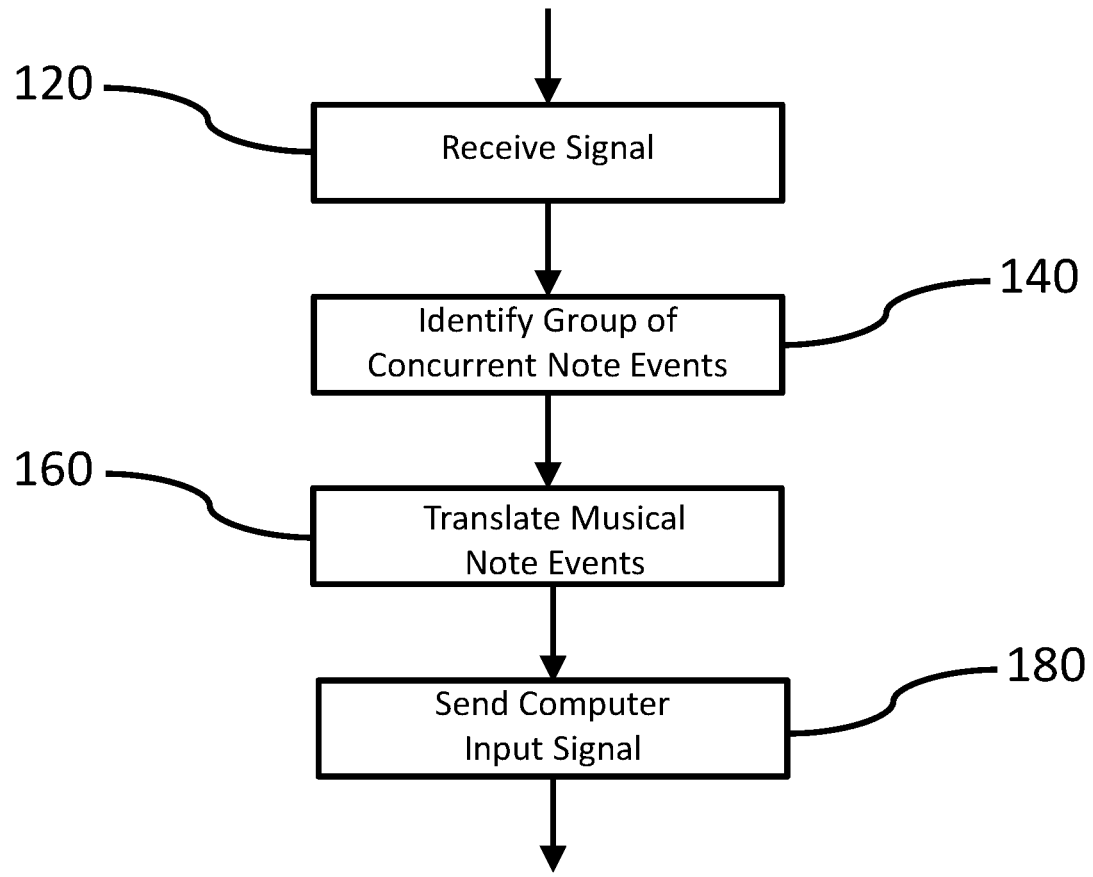
FIG. 1 illustrates an example method for interfacing tones with a computer.

The following detailed description illustrates embodiments of the disclosure and manners by which they can be implemented. Although the preferred mode of carrying out disclosed methods, systems and computer program products has been disclosed, those having ordinary skill in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

For the purpose of describing the invention, the terms "tone" and "note" and the plurals "tones" and "notes" are considered equivalents. A group of concurrent notes may be referred to as a group of concurrent tones and a group of concurrent tones may be referred to as a group of concurrent notes.

The disclosure uses integers to reference MIDI note numbers, intervals between notes. Ditch classes, the sidle interval as reduced from an interval between notes, and the number of notes composing a group of concurrent notes (the cardinality of the group of concurrent notes). The disclosure uses said integers in calculations. For clarity, said integers are prepended with a lowercase character to identify the context of use and are to be interpreted as constants equivalent to the integer. For example, "p12" is a constant equivalent to 12. MIDI note numbers are designated with "n": n0, n1 ... n126, n127. Intervals between notes are designated with "i": i0, i1 ... i126, i127. Pitch classes are designated with "p": p0, p1, p2 ... p10, p11. Simple intervals are designated with "j": j0, i1, i2 ... i10, i11. The size of a group of concurrent notes as measured by the number of notes composing the group of concurrent notes, also known as the cardinality of the group of concurrent notes, is designated with "s": s1, s2, s3 .... An uppercase "N", "P", "I", "J", or "S", with or without an appended integer, represents a variable. For example, using MIDI note numbers, the interval between two notes is calculated with the formula: I=N2−N1. A sidle calculation is: i14=n74−n60.

Examples of the disclosed method reduce all compound intervals to simple intervals when translating groups of concurrent notes to computer keyboard strokes. This method reduces a chord represented by a group of concurrent notes to the chord's close position and translates that chord to computer keyboard strokes. This has the benefit of allowing the user to type across octaves on their instrument, practicing across the range of their instrument while performing typing tasks. In an example, a compound interval (an octave or more) is reduced to a simple interval by the formula: J=(N2−N1) mod 12. A sample calculation is j5=(n77−n60) mod 12.

The disclosure uses scientific pitch notation that uses a subscript to denote the octave to which a note belongs. An example is: C4=n60.

MIDI, an acronym for musical instrument digital interface, is a protocol for communicating digital packets of data describing notes in terms of note events having parameters. MIDI enables synchronization of a variety of electronic musical instruments and connection with related audio devices and computers. MIDI devices facilitate playing, composing, recording and editing music. A type of MIDI device, MIDI controllers, often include interface surfaces modelled as musical instruments such as piano keyboards and guitar frets. The user may interact with a MIDI controller or MIDI instrument as they would with the corresponding instrument. However, instead of producing a musical note, as the instrument would, the MIDI instrument produces a stream of data which consists of instructions that may be used to reproduce the sound that would have been made on an instrument if the same actions were played on it. Typically, the stream of data describes note events having initiation/termination, pitch and velocity parameters according to an event-based protocol. For example, a first byte of a MIDI packet includes a description of a note on/initiation or off/termination status/event, a second byte includes a description of the pitch of the note event and a third byte includes a description of the velocity of the note. The second byte, describing pitch, is known as the MIDI note number, an integer with a value of n0 through n127, a higher value indicating a higher pitch.

The computer keyboard is the ubiquitous human interface device for a user to enter text into a computer. The typical full-sized keyboard has about 101 keys. MIDI devices often have fewer than 100 interface surfaces (keys, buttons and knobs). A full-sized MIDI-enabled piano has 88 musical keys corresponding to MIDI note numbers n21 through n108 and written in scientific pitch notation as A0 through C8.

MIDI devices and computer keyboards serve distinct purposes and normally a person cannot practice musical skills while typing on a computer. Presently, there is no suitable solution allowing the computer keyboard to be replaced by a musical instrument or a MIDI device whereby the user may practice and develop musical skills while working on a computer.

Embodiments of the disclosure substantially eliminate, or at least partially address, problems in the prior art, enabling a music device to emulate the functions of a computer keyboard and be used for providing typing input to a computer. The music device may be a musical instrument such as a piano keyboard, guitar fretboard, xylophone, or may be a device shaped as a musical instrument that only outputs standard keyboard strokes or a MIDI device that produces data describing note initiation and termination events having pitch and velocity. The MIDI device may be shaped as an instrument, for example, in a MIDI piano or a MIDI guitar and, as such, may be considered a musical instrument simulator which produces musical note events.

Combinations of multiple simultaneous or near simultaneous interface surfaces activations or instrument attacks may be mapped to a single computer keyboard keystroke or a series of computer keystrokes. Because each permutation of MIDI keystroke combinations may be mapped to the function of a single computer keyboard key, the full functionality of a 100-key keyboard may be met and surpassed with a 25 key MIDI instrument. As such, a user may use an instrument or MIDI controller such as an electronic piano, MIDI guitar, MIDI drums, MIDI vibraphone, etc., as a replacement for a computer typing keyboard. This allows the user to develop their musical instrument skills while performing tasks on a computer. For example, a user may play chords on a MIDI keyboard to type the text of an email displayed as characters on a screen.

Additional aspects, advantages, features and objects of the disclosure will be made apparent from the drawings and the detailed description of the illustrative embodiments construed in conjunction with the appended claims that follow. It will be appreciated that described features are susceptible to being combined in various combinations without departing from the scope of the disclosure as defined by the appended claims.

FIG. 1 illustrates an example method for interfacing tones of a music device with a computer. The method includes, at 120, receiving a signal carrying, communicating or otherwise representing one or more tones or note events. The signal received may be of any of a variety of types including but not limited to a time varying voltage, current or electromagnetic or mechanical wave and may carry analog or digital information.

For example, an analog signal may be received as an audio signal from a musical instrument through a microphone or instrument pick-up configured to send, either by wire or over the air, signals including or representing one or more tones which may be considered musical notes. Analog may then be converted to digital, as needed.

In another example, a digital signal may be received from a music device such as an instrument simulator, a MIDI controller or a MIDI instrument configured to send, either by wire or over the air, signals including or representing one or more note events. In a further example, an analog signal from a microphone or instrument pick-up may be converted to a MIDI signal representing note events.

Tones from example analog signals have a pitch and volume while note events from example digital signals have or are defined by pitch, velocity and a state parameter indicating initiation/termination. An example note event has pitch, velocity and initiation/termination components. In an example, the pitch component may take any of 128 values and the velocity component may take any of 128 values whereas the initiation/termination parameter takes either an 'on' value or an 'off' value. A note from a MIDI device may include, represent or be defined by one or two note events depending on whether both initiation and termination note events are being taken into consideration. For example, the note may be the entity having the pitch and velocity reflected by an initiation note event and persisting for an indefinite or defined duration or may be the entity having the pitch and velocity reflected in an initiation note event and persisting until a corresponding termination note event is provided.

Figure 2:
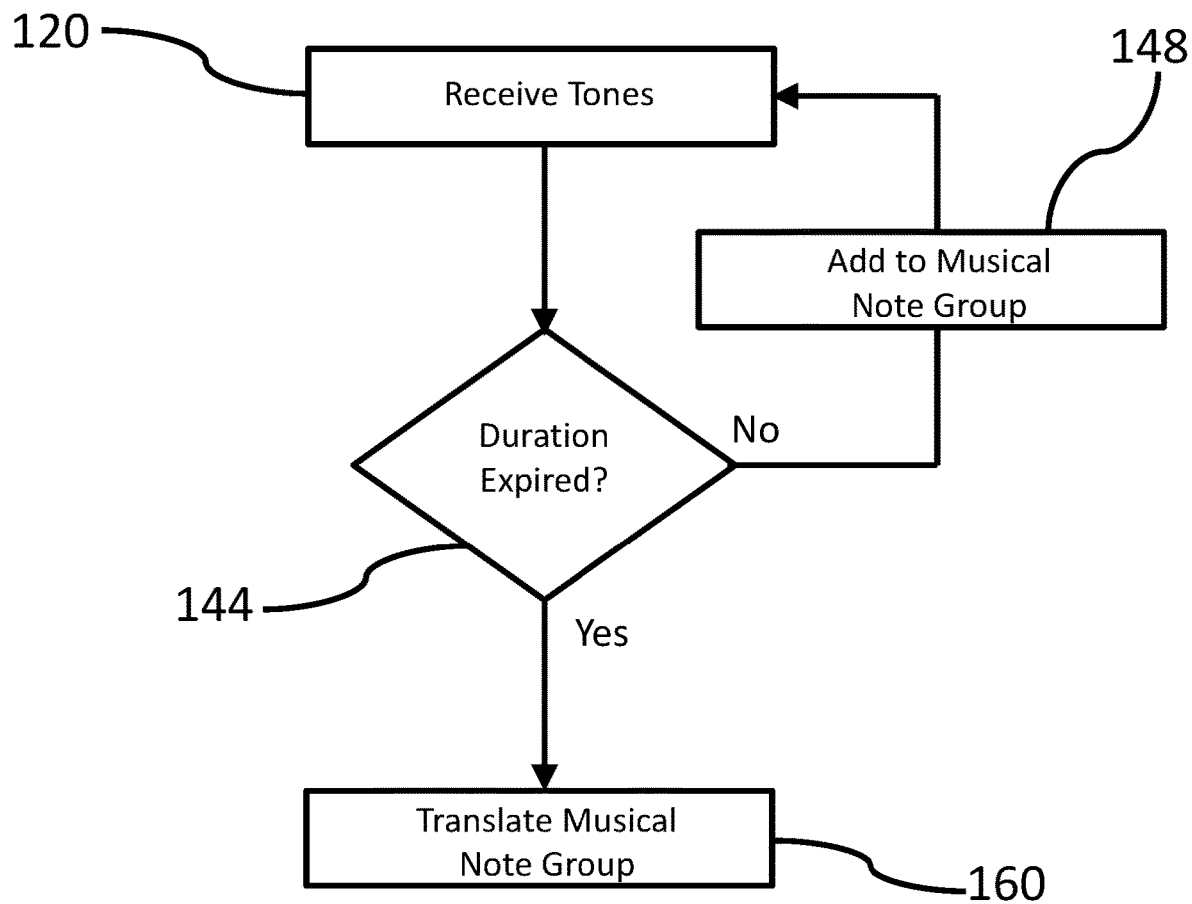
FIG. 2 illustrates an example process for grouping tones or notes.

At 140, a group of simultaneous, near simultaneous or concurrent notes is identified from the one or more tones or note events which will enable chord formation. FIG. 2 illustrates an example process for grouping or collecting tones or notes based upon tones or note events of a signal received.

In an example, while the signal is being received at 120, a processing device may listen for tones or note events and, upon detection or identification of an initial tone or note event, listen for one or more additional tones or note events over a pre-defined, pre-established or pre-set duration which may be adjustable. As such, groups of concurrent notes may be defined by the proximity of the initiation time of the tones or note events or by proximity of the release or termination time of the tones or note events.

Notes will be added to a group at 148 when it is determined at 144 that the duration has not expired. When it is determined at 144 that the duration has expired, the group of notes will be translated at 160 and any subsequently received tones or note events will not contribute to the group but may contribute to a subsequent group.

Concurrency may be determined by a variety of techniques including combinations of those disclosed herein. In the case of a digital signal carrying MIDI data, identifying a group of concurrent note events may include identifying note events which have initiation within the duration or before the duration has expired. In another example, groups may be defined in accordance with one or more initiations measured between an initiation and termination of the initial note event.

In accordance with the pitch of the tones or note events, the group is translated into a computer input signal representative of one or more keystrokes on a computer keyboard at 160. The computer input signal may be representative of one or more keystrokes by, for example, including instructions used to produce verbal output through a human interface device (HID) controller of a computing device. The instructions may be interpreted by the HID controller on the computer as keyboard output.

Translating may be accomplished in accordance with cardinality of the group. While group is often used to refer to more than one item, in the context of the disclosure, group may be inclusive of zero, one or plural tones or notes. As such, the cardinality may theoretically be any non-negative integer but expected values for cardinality will normally be between one and eight. A cardinality of zero would indicate no tone or note event was collected which results in nothing. In an example, a tone or note event is a prerequisite for disclosed methods.

While identification of the group is being performed, a count of the group members or notes may be made. In the case where notes are identified in accordance with MIDI initiations received within a temporal proximity, the cardinality of the group may simply be the number of initiations received within the given duration.

In another example, for a digital signal having a first note event including a termination component directly following an initiation component of the first note event, the count may be determined as one while for a digital signal having a second note event including an initiation component between the initiation component of a first note event and the termination component of the first note event, the count may be determined as two and for a digital signal having second and third note events including initiation components between the initiation component of a first note event and the termination component of the first note event, the count may be determined as three.

In further example, leading note event status may be assigned to the note event of the one or more note events which has the earliest initiation component and the count is determined from the number of note events having initiation components before the termination of the leading note event.

Upon elapse of the pre-defined duration without detection of one or more additional tones or note events, cardinality of the group is determined as one and the initial tone or note is translated at 160 into a computer input signal representative of one or more keystrokes on a computer keyboard.

Translating may be accomplished in accordance with a pitch class to which each tone or note event belongs as determined from the pitch thereof. Each tone or note event will belong to one of twelve pitch classes each expressed in a variety of octaves covering a range of pitches or frequencies. In an equal tempered tuning with no microtones, the twelve pitch classes are recognized by the note names 'C', 'C #', 'D', 'D#', 'F', 'F#', 'G', 'G#', 'A', 'A#' and 'B' or the equivalent 'C', 'Db' (D-flat), D, Eb, E, F, Gb, G, Ab, A, Bb and B. The twelve pitch classes are represented by integer notation as p0 through p11 representing pitch classes C through B, respectively. MIDI note numbers represent repeating pitch classes with the modulus 12 such that an integer pitch class, "P", to which a note, "N", belongs may be determined as: P=N mod 12. As an instance of congruence classes, the pitch classes each represent a set of discrete or nearly discrete pitches or frequencies which, for the purposes of Western music theory, are considered congruent. Theories explaining why these pitches or frequencies are considered congruent are beyond the scope of the disclosure. Nevertheless, at a recognized pitch or frequency range above a note belonging to pitch class B, a tone or note event will be considered congruent to 'C' as the pitch or frequency ranges get wrapped back around in accordance with the congruencies. Each member of a pitch class is separated from other members by one or more frequency or pitch intervals known as octaves in Western music theory. For example, each member of the pitch class named A' has a frequency associated with 440 Hz×2x; wherein x is an integer.

Translating an initial tone in isolation from other tones may include translating into computer input representative of one of twelve keystrokes according to the pitch class of the initial tone. An isolated tone may be translated into computer input representative of a character. For example, the computer input may be representative of a digit. In a key:value syntax for preserving space, an example mapping translates single notes to a keystroke value according to the pitch class to which the note belongs: C:0, C #:1, D:2, D #:3, E:4, F:5, F #:6, G:7, G #:8, A:9, A #:BKSP and B: Enter.

Upon detection of one or more additional tones or note events within a period of collection of concurrent notes, cardinality of the group of concurrent notes is greater than one and a combination of the initial tone or note event and the one or more additional tones or note events yields a chord. The chord may then be translated into a computer input signal representative of one or more keystrokes on a computer keyboard. The combination may be translated into computer input representative of a character. For example, the computer input may be representative of a letter, punctuation or a function key.

In an example, when the cardinality of a group of concurrent notes is determined to be two, the group, which is a pair, is translated into computer input representative of one of seven sets of twelve keystrokes which may be, for example, a character. A pair of grouped, concurrent tones or notes forms a dyad according to Western music theory. In an example, translating a dyad may further include translating into computer input representative of one of eighty-four keystrokes. Given the twelve pitch classes previously discussed, 144 dyads are possible including dyads formed from a pair of tones of the same pitch class.

Translating may further include ordering tones or notes of the group of concurrent notes in accordance with the pitch of the tones or notes of the group. For example, tones having a lower pitch are ordered before tones having a higher pitch in ascending order of the representative MIDI note numbers. In a further example, tones or notes having a higher pitch are ordered before notes having a lower pitch by descending order of the representative MIDI note numbers.

With tones or notes of the group of concurrent notes ordered into a sequence, a simple intervals J may be computed between adjacent notes of the sequence in order to determine a translation for the group of concurrent notes by subtracting the MIDI note number of a lower note from the MIDI note number of a higher note and computing this difference modulo 12 using the equation: (N2−N1) mod 12=J. An example is: (n72−n43) mod 12=i5.

For the purposes of the disclosure, the value of an interval computed between sonically adjacent tones or notes is considered to be one or i1, as the difference between consecutive MIDI notes is one, but in Western music theory, this would be considered one half-step. Thus, the interval between C3 and C #3 would be considered i1 or one half-step. As further examples, the interval between C5 and D5 would be considered i2 or two half-steps and the interval between C4 and E4 would be considered i4 or four half-steps and the interval between G4 and C5 is calculated as (n72−n67)=i5.

In an example, the above-mentioned dyad is translated into computer input representative of one of a first set of twelve keystrokes when the simple interval is computed as i1, known as a minor second. In the key:value syntax, an example mapping translates dyads reducing to a simple interval of j1 to a keystroke value according to C-Db:F1, C #-D:F2, D-Eb:F3, D #-E:F4, E-F:F5, F-Gb:F6, F #-G:F7, G-Ab:F8, G #-A:F9, A-A #:F10, A #-B:F11 and B-C:F12. This may also be represented as (i1, p0): F1, (i1, p1):F2, (i1, p2): F3, (i1,p3):F4, (i1, p4): F5, (i1, p5): F6, (i1, p6): F7, (j1,p7):F8, (j1,p8):F9, (j1,p9):F10, (j1,p10):F11, (j1,p11): F12.

In an example, a dyad is translated into computer input representative of one of a second set of twelve keystrokes when the interval is reduced to the simple interval j2, known as a major second. In the key:value syntax, an example mapping translates dyads reducing to a simple interval of j2 to a keystroke value according to C-D:!, C #-D #:@, D-E: #, Eb-F:$, E-F #:%, F-G:ˆ, F #-G #:&, G-A:*, G #-A #:(, A-B:), Bb-C:- and B-C #:=. This may also be represented as (i2, p0):!, (j2, p1):@, (j2, p2): #. (j2, p3):$ (j2, p4):% (j2, p5):ˆ, (j2, p6):& (j2, p7):*, (j2, p8):((j2, p9):) (j2, p10):-, (j2, p11):=.

In an example, a dyad is translated into computer input representative of one of a third set of twelve keystrokes when the interval is reduced to the simple interval i3, known as a minor third. In the key:value syntax, an example mapping translates dyads reducing to a simple interval of j3 to a keystroke value according to C-Eb:PgDn, C #-E:Home, D-F:Tab, D #-F #:End, E-G:Insert, F-Ab:Del, F #-A:Up, G-Bb:Left, G #-B:Enter, A-C:Right, A #-C #:Down and B-D:PgUp. This may also be represented as (i3,p0):PaDn, (i3,p1):Home, (i3,p2):Tab, (j3, p3): End, (j3, p4): Insert, (j3, p5): Del, (j3, p6): Up, (j3, p7): Left, (j3, p8): Enter, (j3,p9): Right, (j3,p10):Down and (j3,p11):PgUp.

In an example, a dyad is translated into computer input representative of one of a fourth set of twelve keystrokes when the interval is reduced to the simple interval j4, known as a major third. In the key:value syntax, an example mapping translates dyads reducing to a simple interval of j4 to a keystroke value according to C-E:q, Db-F:w, D-F #:e, Eb-G:r, E-G #:t, F-A:y, F #-A #:u, G-B:i, Ab-C:o, A-C #:p, Bb-D:[and B-D #:]. This may also be represented as (j4,p0): q, (j4,p1):w, (j4,p2):e, (j4,p3):r, (j4,p4):t, (j4,p5):y, (j4,p6):u, (j4,p7):i, (j4,p8):o, (j4,p9):p, (j4,p10):[, (i4,p11):].

In an example, a dyad is translated into computer input representative of one of a fifth set of twelve keystrokes when the interval is reduced to the simple interval j5, known as a perfect fourth. In the key:value syntax, an example mapping translates dyads reducing to a simple interval of j5 to a keystroke value according to C-F:a, C #-F #:s, D-G:d, D #-G #1, E-A:g, F-Bb:h, F #-B:j, G-C:k, G #-C #:l, A-D:;, A #-D #:' and B-E:Enter. This may also be represented as (j5,p0):a, (j5,p1):s, (j5,p2):d, (j5,p3):f, (j5,p4):a, (j5,p5):h, (j5,p6):j, (j5,p7):k, (j5,p8):I, (j5,p9):: (j5,p10):', (j5, p11): Enter.

In an example, a dyad is translated into computer input representative of one of a sixth set of twelve keystrokes when the interval reduced to the simple interval j6, known as an augmented fourth/diminished fifth. In the key:value syntax, an example mapping translates dyads reducing to a simple interval of j6 to a keystroke value according to C-F #:Shift, Db-G:CapsLock, D-G #:ctl, Eb-A: unassigned, E-A #:Windows/Option, F-B: Escape, Gb-C: Print Screen, G-C #:unassigned, Ab-D:Scroll Lock, A-D #:unassigned, Bb-E: Pause/Break and Cb-F:Compose. This may also be represented as (j6,p0):Shift, (j6,p1):CapsLock, (i6,p2):ctl, (i6, p3):unassigned, (j6,p4):Windows/Option, (i6,p5):Escape, (i6,p6):Print Screen, (j6, p7): unassigned, (j6, p8): Scroll Lock, (j6, p9): unassigned, (j6, p10): Pause/Break and (j6, p11):Compose.

In an example, a dyad is translated into computer input representative of one of a seventh set of twelve keystrokes when the interval is reduced to the simple interval j7, known as a perfect fifth. In the key:value syntax, an example mapping translates dyads reducing to a simple interval of j7 to a keystroke value according to C-G:z, C #-G #:x, D-A:c, D #-A #:v, E-B:b, F-C:n, F #-C #:m, G-D:,, G #-D #:.., A-E:/, Bb-F:\ and B-F #:'. This may be represented as (j7,p0):z, (j7,p1):x, (j7,p1):c, (j7,p1):v, (j7,p1):b, (j7,p1):n, (j7,p1):m, (j7,p1):, (j7,p1):, (j7,p1): (j7,p1):/, (j7,p1):\ (j7,p1)'.

The above dyad mappings, in particular, facilitate expedient learning of the chords necessary to produce keyboard input to a computer since each set of dyads having a given or particular interval are mapped to a given or particular row of keys from which the keystroke output is drawn. Additionally, the keystrokes mapped from a given row according to the tones or notes of the group of concurrent notes progress from the left end of the row to the right end of the row as the pitch class to which the bass tone or note of the group increases through the series: p0, p1, p2, p3, p4, p5, p6, p7, p8, p9, p10, p11. Further, the row from which a keystroke is mapped to a dyad advances from the top towards the bottom of the computer keyboard as the computed simple interval J, of the dyad increases.

When the cardinality of a group of concurrent notes is determined to be more than two, translating the combination may further include translating into computer input representative of one of a plurality of modifying keystrokes configured to modify one or more previously or subsequently translated initial tones or one or more previously or subsequently translated groups or combinations of notes.

When more than two tones or note events are received, the method may further include computing a simple interval between a second tone and any following tone and computing simple intervals between consecutive pairs of any subsequent tones.

Figure 3:
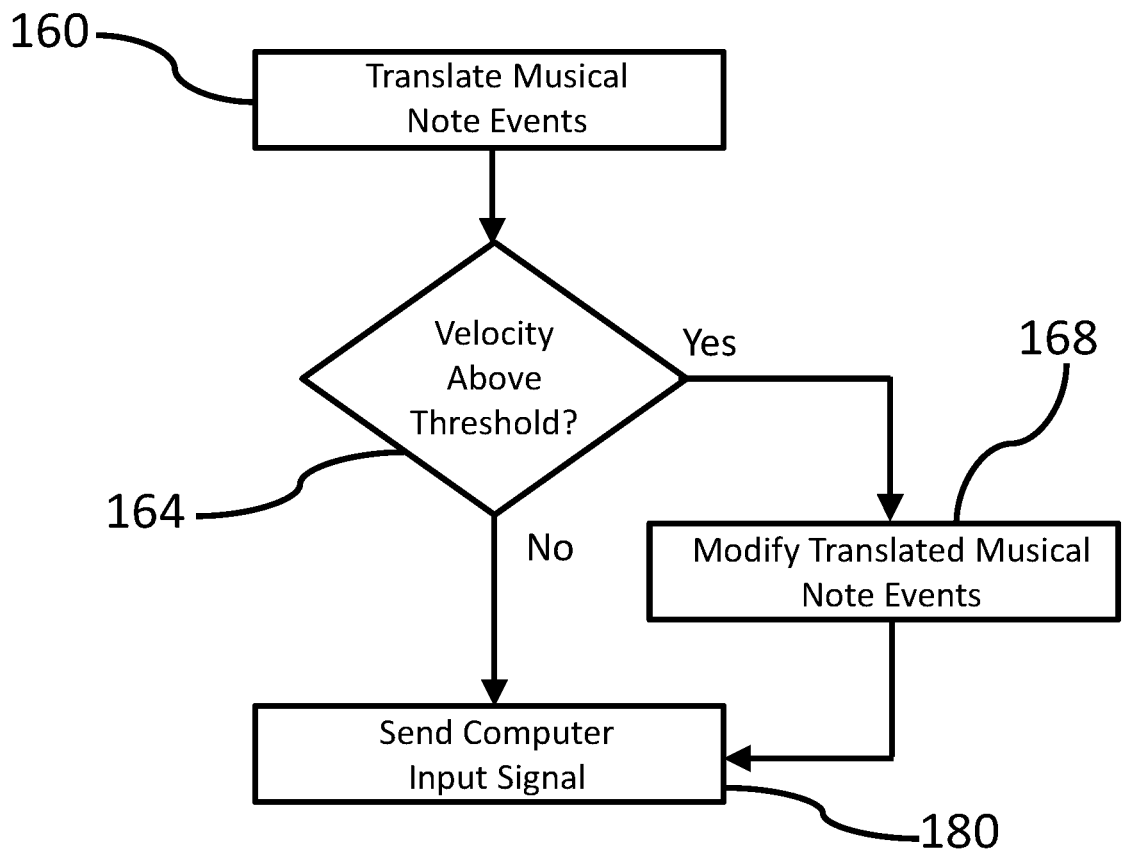
FIG. 3 illustrates an example process for influencing translation with velocity or volume.

Translating may further include translating in accordance with the velocity of one or more note events of the group or the volume of tones in an example analog embodiment. FIG. 3 illustrates an example process for influencing translation with velocity. With one or more notes or note events translated at 160, it is determined, at 164, whether the velocity of any note event is above a set threshold. When one or more note events has a velocity above the threshold, the translated note events are modified at 168 as though with a computer keyboard modifier key such that the one or more note events is translated into a computer input signal representative of both a keystroke on a computer keyboard and activation of a computer keyboard modifier key. After modification at 168, the computer input signal including translated notes with a modifier key is sent at 180. When it is determined, at 164, that none of the note events is above the threshold, the translated note events are sent as computer input signal at 180 without communication or representation of any modifier keystrokes.

In an embodiment provided with input from a musical instrument by microphone or pick-up, volume, rather than velocity would be considered. It is determined, whether the volume of any tone in a group of concurrent tones is above a set threshold. When one or more tones in the group of concurrent tones has a volume above the threshold, the translated tones are modified. After modification, the computer input signal including translated notes with a modifier key is sent. When it is determined that none of the tones is above the threshold, the translated tones are sent as computer input signal without communication or representation of any modifier keystrokes.

In another example, determining whether the velocity of any note event or volume of any tone is above the threshold may be performed prior to translating any of the individual note events or the group of concurrent note events.

As with the temporal proximity and/or the duration during which tones or notes are considered concurrent, the threshold velocity and/or threshold volume may be a pre-defined, pre-established or pre-set threshold which may be adjustable.

Returning to FIG. 1, after translation, the computer input signal is sent to a computer for output or further processing at 180. With the computer input signal, the computer may present verbal output to a user in accordance with the computer input signal. Presenting verbal output to a user may include but is not limited to presenting text output to a display and/or presenting spoken word or other vocal audio through a speaker. In consideration of the above, verbal output is output in accordance with the computer input signal and/or the pitches, velocities and initiations/terminations.

The actions described with reference to FIGS. 1-3 are only illustrative and other alternatives can also be provided where one or more actions are added, one or more actions are removed, or one or more actions are provided in a different sequence without departing from the scope of the claims herein.

Figure 4:
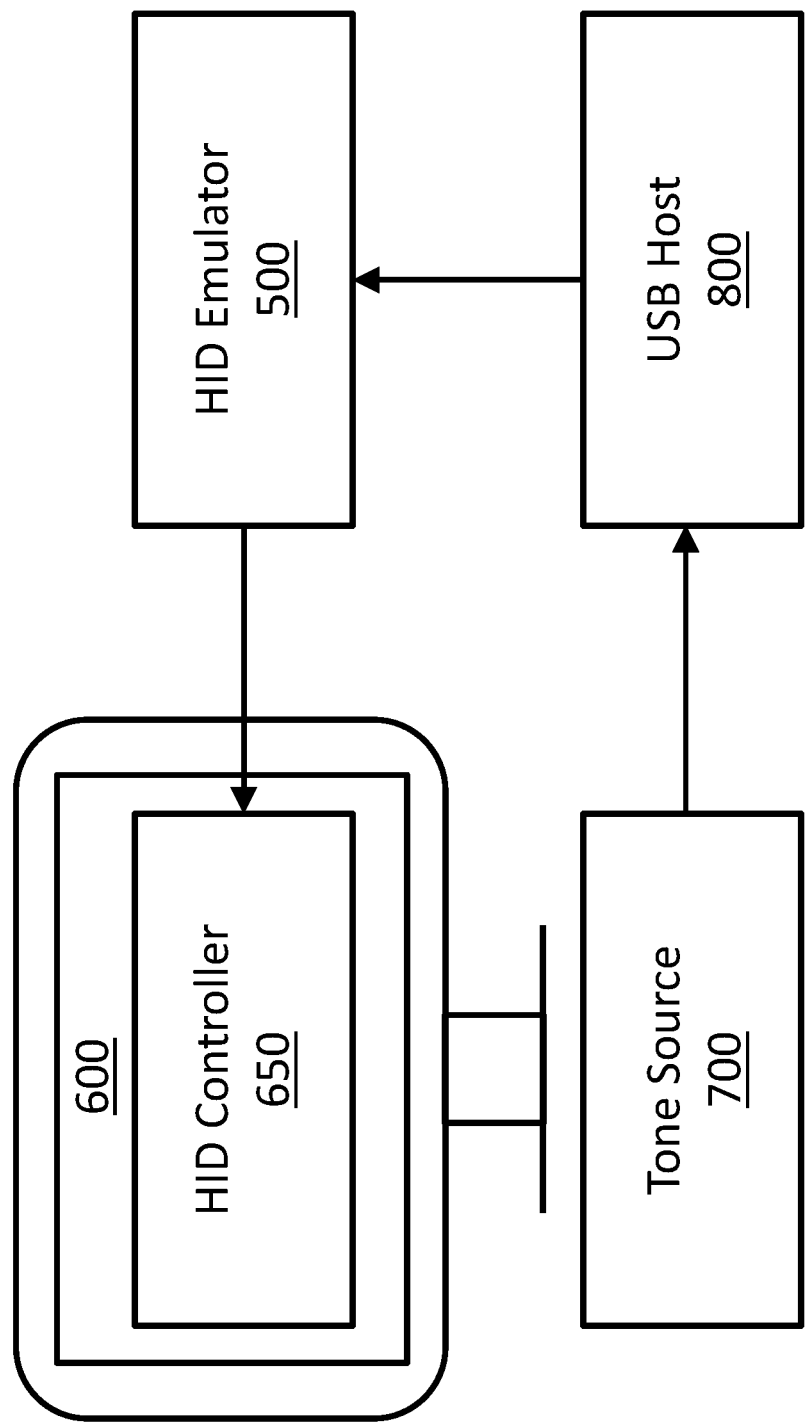
FIG. 4 illustrates a schematic overview of an example system associated with disclosed methods and processes.

FIG. 4 illustrates a schematic overview of an example system suitable for performing disclosed methods and processes including but not limited to those described with reference to FIGS. 1-3. A tone source 700 sends a signal to a human interface device (HID) emulator 500 which converts or translates tones from tone source 700 for sending to an HID controller 650 at a computing device 600. In some implementations wherein emulator 500 is not enabled to act as a USB host, a separate USB host 800 may be provided.

Tone source 700 may be a MIDI device including a MIDI controller, MIDI instrument or simulated instrument with circuitry configured to output a digital signal representing a series of note events each having an initiation/termination, a pitch and a velocity. In another example, tone source 700 may be a microphone or instrument pick-up configured to send analog signals including tones to HID emulator 500. Labels may be provided to keys or other interface surfaces of tone source 700 reminding a user of mappings used to translate to computer keyboard keys. For example, the labels may indicate keystroke values set forth above in accordance with the key:value syntax.

When tone source 700 is a MIDI controller and a MIDI key or interface surface is used, a MIDI data packet is sent to microcontroller 520 indicating either that a note was initiated/turned on/struck or terminated/turned off/released, the MIDI note value indicating the pitch, and the velocity of the note. In an example, a note with a velocity of zero may be used to indicate a note termination.

Computer 600 is optionally implemented by way of at least one of: a mobile phone, a smart telephone, an MID, a tablet computer, a UMPC, a phablet computer, a PDA, a web pad, a PC, a handheld PC, a laptop computer, a desktop computer, an NAS device, a large-sized touch screen with an embedded PC, and an interactive entertainment device, such as a game console, a TV set and an STB.

Computer 600 may include, but is not limited to, a data memory, a computing hardware such as a processor, Input/Output (I/O) devices, a network interface, a configuration of sensors, a storage, and a system bus that operatively couples various components including the data memory, the processor, the I/O devices, the network interface, the sensors and the storage.

Computer 600 also includes a power source for supplying electrical power to the various components. The power source may, for example, include a rechargeable battery.

The I/O devices may include a display screen for presenting graphical images to a user of the computer. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. The I/O devices may include a mouse or a joystick that is operable to receive inputs corresponding to clicking, pointing, and/or moving a pointer object on the graphical user interface. The network interface optionally allows the computer to communicate with other computers, for example, via a communication network.

Figure 5:
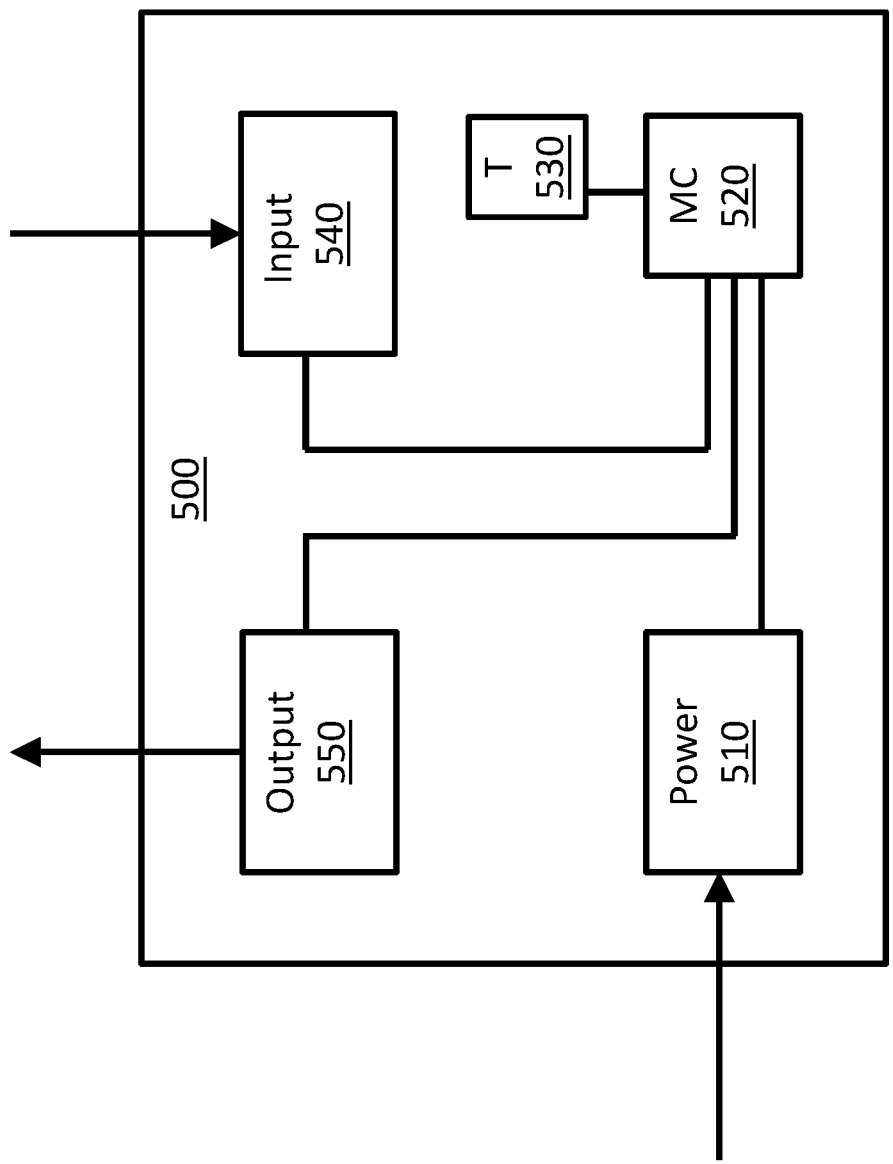
FIG. 5 illustrates a schematic overview of an example microcomputer associated with disclosed methods and processes.

FIG. 5 schematically illustrates various components of an HID emulator 500 implemented as a microcomputer suitable for use in association with disclosed systems for interfacing music devices with a computer. Microcomputer 500 includes, but is not limited to, a microcontroller 520, a timer 530, input devices 540, output devices 550 and a power input 510. Microcontroller 520 includes data memory, program memory and computing hardware such as a processor on a single chip but data memory, program memory and a microprocessor may be provided to microcomputer 500 separately. In an example, microcomputer 500 is implemented as a single printed circuit board.

Power input 510 supplies electrical power to the various components of microcomputer 500 including but not limited to microcontroller 520, timer 530, input devices 540 and output devices 550.

Microcontroller 520 stores a number of modules to the internal data memory which may, for example, be parts of a software product associated with interfacing music devices and/or tones with a computer. Executing the software product on the processor of microcontroller 520 results in microcomputer 500 performing one or more of the actions described with reference to FIGS. 1-3 including but not limited to computer-implemented method for interfacing music devices or tones with a computer.

Input devices 540 may include but are not limited to GPIO pins, one or more buttons, one or more USB or micro-USB jacks and combinations of these. Output devices 550 may include but are not limited to GPIO pins, one or more LEDs to provide visual output to a user, one or more speakers to provide audio output to the user, one or more USB or micro-USB jacks and combinations of these.

Timer 530 is configured for providing system time as reference for associating time-stamps with actions and/or data input to microcomputer 500 such as initiation/termination note events.

When executed on microprocessor of microcontroller 510, the stored program code of the software modules causes the microprocessor to and/or configures the microprocessor to receive, through input devices 540, a signal representing one or more tones or note events each having a pitch and identify a group of concurrent notes from the one or more tones or note events. In the event the signal is a digital signal carrying note events from a music device, note events may have a pitch, a velocity and an initiation/termination.

Microcomputer 500 may be configured to listen for the tones by listening for tones programmed as one or more digital signals or to listen for the tones with a microphone.

In an example wherein the microprocessor receives note events from a MIDI device, when executed on the microprocessor of microcontroller 510, the stored program code of the software modules causes the microprocessor to and/or configures the microprocessor to identify a group of concurrent notes by identifying note events having initiation components within a duration as having the temporal proximity set for concurrency.

The microprocessor may loop through logic listening for any MIDI data sent by the MIDI device during a time period (T) and form a chord from MIDI messages having initiation between the time an initial note is received, t0, and a later time t0+T wherein T is a time period which may be configured as a default value or as modified by a user. Whether an array or group of concurrent notes is active may be indicated by a Boolean valued variable that indicates whether notes are being collected in an array. In an active array, multiple initiations and note values are being collected.

If a MIDI packet sent by the MIDI device indicates an initiation and there is no active array of concurrent notes, then a MIDI note value determined from the pitch is used as the first value in an array of notes forming the group of concurrent notes. A boolean value is set to indicate that the array is active and the expiration time of the collection of note values into the array is calculated by adding the defined note collection duration to the current time or the time of the initiation of the first note event/MIDI packet. In an example, the note collection duration is 150 milliseconds.

Upon elapse of the pre-defined duration without detection of one or more additional tones or note events, the stored program code of the software modules causes the microcomputer to and/or configures the microcomputer 500 to translate the initial tone or note into a computer input signal representative of one or more keystrokes on a computer keyboard.

The microprocessor may be further configured to translate the initial tone or note by translating into computer input representative of one of twelve keystrokes according to the pitch class of the initial tone. As mentioned above, the initial tone may be translated into computer input representative of a character. For example, computer input may be representative of a digit.

If the MIDI packet indicates an initiation and there is an active array, the MIDI note number of the MIDI packet is added to the array. After the note collection duration expires, the MIDI note data from the array is analyzed and translated into keystroke data.

Alternatively, chords may be defined by the proximity of the termination of the MIDI notes, or by a combination of these two methods or by another method.

In another example, the microprocessor may be configured to determine the cardinality, S, of concurrent notes by, for a digital signal having a first note event including a termination component directly following an initiation component of the first note event, determining the cardinality is one or s1. The microprocessor may be configured to, for a digital signal having a second note event including an initiation component between an initiation component of a first note event and a termination component of the first note event, determine the cardinality is two or s2. The microprocessor may be configured to, for a digital signal having second and third note events including initiation components between an initiation component of a first note event and a termination component of the first note event, determine the cardinality is three or s3.

In yet another example, the microprocessor may be configured to determine the cardinality of concurrent notes by assigning initial note event status according to the note event of the one or more note events which has the earliest initiation component and determining a cardinality of note events having initiation components earlier than the termination of the initial note event.

The stored program code of the software modules causes and/or configures microcomputer 500 to translate the group of concurrent notes into a computer input signal representative of one or more keystrokes on a computer keyboard in accordance with the pitch of the tones or note events of the group by ordering the tones or note events by the representative MIDI note numbers into a sequence. In a further example, the microprocessor may be configured to translate by translating in accordance with the pitch class to which each note of the group of concurrent notes belongs as determined from the pitch of each note event of the group of concurrent notes.

The stored program code of the software modules causes and/or configures microcomputer 500 to translate the group of concurrent notes in accordance with the group cardinality. The microprocessor may be further configured to translate the combination by translating into computer input representative of one of eighty-four keystrokes when the combination is a dyad.

Groups of concurrent notes may be translated by the microprocessor according to the pitch class to which the bass note of the group belongs and the computed intervals between the tones in the group of concurrent tones when ordered by pitch. Pitches in a group of concurrent tones are sorted in ascending pitch order by MIDI note number into a sequence and mapping to keystrokes is determined by the pitch class to which the bass note of the group of concurrent notes belongs and the computed interval between the adjacent pitches in the sorted sequence.

According to one example, a group of concurrent notes includes F4 (n65) and C3 (n48). The interval between members of the group is j17 half tones between pitches. The microprocessor sorts the group, (F4, C3) in ascending pitch order to (n48, n65), identifies the pitch class to which the bass note of the group of concurrent notes belongs as n48 mod 12=p0 and computes the simple interval between the notes of the group of concurrent notes as (n65-n48) mod 12=j5 (half tones). This group may be mapped as (j5,p0):"a"

The microprocessor may be further configured to translate the combination or group of concurrent notes by translating the pair of tones or notes into computer input representative of one of a first set of twelve keystrokes when the simple interval is computed as j1, into computer input representative of one of a second set of twelve keystrokes when the simple interval length is computed as j2, into computer input representative of one of a third set of twelve keystrokes when the simple interval is computed as j3, into computer input representative of one of a fourth set of twelve keystrokes when the simple interval is computed as j4, into computer input representative of one of a fifth set of twelve keystrokes when the simple interval is computed as five, into computer input representative of one of a sixth set of twelve keystrokes when the simple interval is computed as j6 and into computer input representative of one of a seventh set of twelve keystrokes when the simple interval is computed as j7.

The microprocessor may be further configured to translate into computer input representative of a character. For example, the computer input may be representative of letter.

According to another example, a group of concurrent notes includes E3, G5, and C3. The microprocessor sorts the group by MIDI note number, (C3, E3, G5) in ascending pitch order to (C3, E3, G5) or (n48, n52, n79), identifies the pitch class to which the bass note of the group belongs as n48 mod 12=p0 and computes the simple intervals between adjacent notes as (n52-n48) mod 12=i4 and (n79-n52) mod 12=j3. This group may be mapped as (j4,j3,p0):"and". The pitch class intervals (j4,j3) represents a class of triads known as mayor chords in the root position. The notation (i4,i3,p0) represents a class of triads known as C mayor in the root position and comprises variations of the C major chord played in the close or open positions. In the close position, all three notes composing the chord are within one octave. In the open position, the notes may be spread across two or more octaves.

In an example, a triad is translated into computer input representative of one of a first set of twelve keystrokes when the simple intervals are computed as (j4,j3), known as a major chord in root position. In the key:value syntax, an example mapping translates triads having computed simple intervals of (j4,j3) to a keystroke value according to (j4,j3, p0):"and", (j4,j3,p1):"was", (j4,j3,p2):"thank", (j4,j3,p3): "is", (i4, i3, p4):"the", (i4, i3,p5):"vou", (i4, i3, p6):"when", (i4, i3,p7):"1", (i4, i3, p8):"of", (i4,i3,p9):"mv", (i4,i3,p10): "he", (i4,i3,p11):"not".

According to another example, a Group of three concurrent notes are sorted by pitch and comprise (E3, G3, C4 or n52, n55, n60). This chord is recognized as the first inversion of C mayor, commonly notated as C/E. The pitch class of the bass note is calculated as p4 and the simple intervals between the notes are calculated as j3-j5. The simple intervals j3-j5 represent a class of triads known as the first inversion of major chords. The class comprises the first inversion of all major triads played in the close or open position. Following previous examples, the first inversion of a chord is described by the pitch class of the bass note and the simple intervals computed between the ordered notes, in this example (j3,j5,p4). In this manner the twelve classes known as first inversion of a mayor chord are described: C/E:(i3,i5,p4), Db/F:(i3,i5,p5), D/F #:(j3,j5,p6), Eb/G:(j3, j5,p7), E/G #:(j3,j5,p8), F/A:(j3,j5,p9), F #/A #:(j3,j5,p10), G/B:(j3,j5,p11), Ab/C:(j3,j5,p0), A/C #:(j3,j5,p1), Bb/D:(j3, j5,p2), B/D #:(j3,j5,p3). As described in previous examples, each of the twelve major chords in the first inversion may be translated into computer input: (j3,j5,p4):"has", (j3,j5,p5): "she", etc.

According to another example, a group of concurrent notes includes A4, G4, B4, and F4. The microprocessor sorts the group of concurrent notes, (A4, G4, B4, F4) or (n69, n67, n71, n65) in ascending pitch order to a sequence (n65, n67, n69, n71), identifies the pitch class to which the bass note of the group belongs as p5 computes the simple intervals between adjacent notes of the sequence as j2 between n65 and n67, j2 between n67 and n69, and j2 between n69 and n71. This group may be mapped as (j2,j2,j2,p5):ESC (escape key).

The microprocessor may be further configured to translate the group of concurrent notes by translating into computer input representative of one of a plurality of modifying keystrokes configured to modify one or more previously or subsequently translated groups. Examples of modifying keystrokes are the ctl (control) key, shift key, or alt key, option key, command key, and windows key.

The microprocessor may be further configured to translate by, for notes of the group of concurrent notes with note events having velocity above an adjustable threshold, translating into a computer input signal representative of both a keystroke on a computer keyboard and activation of a computer keyboard modifier key.

The microprocessor may be further configured to translate by, for notes of the group with note events having velocity above an adjustable threshold, translating into a computer input signal representative of both a keystroke on a computer keyboard and activation of a computer keyboard modifier key.

The microprocessor is further configured to send the computer input signal through the output devices 550 to a computer for output or further processing. For example, to send the computer input signal, the microprocessor may transmit, either by wire or over the air, signals including or representing one or more keystrokes.

FIG. 5 is merely an example, which should not unduly limit the scope of the claims herein. It is to be understood that the specific designation for microcomputer 500 is provided as an example and is not to be construed as limiting the microcomputer 500 to specific numbers, types, or arrangements of modules and/or components thereof. Modules and associated programming may include open-source software libraries used to simulate typing keyboard strokes. A person skilled in the art will recognize many variations, alternatives, and modifications of embodiments of the present disclosure.

In an example, the computer input signal produced by microcomputer 500 is received by the computer operating system and handled and/or interpreted by an HID controller of computer 600. Computer 600 is configured to present verbal output to a user in accordance with the contributions of the pitches, velocities and initiations/terminations to the translations.

Embodiments of the disclosure further provide a computer program product that includes a non-transitory or non-transient computer-readable storage medium storing computer-executable code for interfacing musical instruments/tones with a computer. The code, when executed, is configured to cause one or more processing or computing devices to perform the actions of disclosed methods as described above with reference to FIGS. 1-3.

In an example, when executed, the code is configured to cause one or more processing or computing devices, such as microcontroller 520 of microcomputer 500, to receive, through the one or more inputs, a digital signal representing one or more note events each having a pitch, a velocity and an initiation/termination. From the received digital signal, the processing or computing devices are configured, by the code, to identify a group of concurrent notes from the one or more note events and, in accordance with the pitch of the notes of the group, translate the group of notes into a computer input signal representative of one or more keystrokes on a computer keyboard. When executed, the code is further configured to cause one or more processing or computing devices to send the computer input signal through the one or more outputs to a computer for output or further processing.

As actions of disclosed methods may be provided in different sequences, so the computer-executable code may be configured to provide a service having a different sequence of actions from those described above. It should be noted that use of the key:value syntax in the listing of mappings to keystrokes above is not intended to suggest use of key:value data structures as part of the instructions in the computer-executable code or as part of any input to or output from the computer-executable code or HID emulator 500.

In an example, USB Host 800 and HID emulator 500 are omitted and circuitry, logic and/or computer program may be embedded within a MIDI device and housed as a separate circuit board or on the same circuit board, microchip, or embedded MIDI controller that the MIDI device uses to send MIDI data.

In another example, USB Host 800 and HID Emulator 500 are omitted and actions may be performed by computer program code on the computer receiving MIDI signals from the MIDI device. The software may receive MIDI data from the MIDI device and send keystroke data to the operating system.

In an example excluding a MIDI device, a musical instrument is played into a microphone input to a computer. Computer program code running on the computer analyzes the sound waves to determine what notes are being played. The program code then translates the notes into keyboard strokes.

In another example, USB Host 800 and HID Emulator 500 are omitted and actions may be performed by computer program code provided as an app on a mobile phone or other app hosting device that receives the MIDI data from the MIDI device and transmits typing keystrokes to a computer or uses the typing keystrokes on the app hosting device.

In an example, a programmable controller or app on a phone or other app hosting device is equipped with a microphone and programmed to recognize notes played into the microphone and implements the logic to translate note sequences into chords and sends the appropriate keystrokes to the computer.

Monophonic instruments such as a flute or trumpet sound one note at a time. Such instruments may employ described systems and methods by increasing the time interval for which a chord is defined.

In a further example, MIDI signals such as pitch modulation and bend may send messages to the computer HID controller and/or operating system to simulate mouse movements or mouse clicks.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A method for interfacing music devices with a computer, comprising:
   with a microprocessor:
      receiving a digital signal representing one or more note events each having a pitch, a velocity and an initiation;
      identifying a group of concurrent notes from the one or more note events, wherein the group of concurrent notes includes a bass note and each note of the group of concurrent notes is a member of a pitch class corresponding with the pitch of each note;
      sequentially ordering the notes of the group of concurrent notes according to the pitch of each note, thereby creating a sequence of notes wherein every two adjacent notes in the sequence constitutes a pair;
      computing an interval between the two notes in each pair of adjacent notes of the sequence of notes using the pitch classes corresponding to each note of the pair;
      in accordance with the pitch class corresponding to the bass note of the group of concurrent notes and the computed intervals, translating the group of concurrent notes into a computer input signal representative of one or more keystrokes on a computer keyboard; and
      sending the computer input signal to a computer for output or further processing.

2. The method as set forth in claim 1, wherein identifying the group of concurrent notes further comprises identifying the note events having initiation within an adjustable duration.

3. The method as set forth in claim 1, wherein translating further comprises translating in accordance with cardinality of the group of concurrent notes.

4. The method as set forth in claim 3, wherein translating further comprises translating such that each group of condurrent notes with a cardinality of two notes having a particular interval computed therebetween are translated into a computer input signal representative of a keystroke from a particular row of the computer keyboard.

5. The method as set forth in claim 1, wherein translating further comprises translating in accordance with the velocity of one or more note events of the group of concurrent notes.

6. The method as set forth in claim 1, wherein translating further comprises, for note events of the group of concurrent notes having velocity above an established threshold, translating into a computer input signal representative of both a keystroke on the computer keyboard and activation of a modifier key on the computer keyboard.

7. A system for interfacing tones with a computer, comprising:
- one or more inputs;
- one or more outputs;
- a microprocessor configured to:
  - receive, through the one or more inputs, a digital signal representing one or more note events each having a pitch, a velocity and an initiation;
  - identify a group of concurrent notes from the one or more note events, wherein the group of concurrent notes includes a bass note and each note of the group of concurrent notes is a member of a pitch class corresponding with the pitch of each note;
  - sequentially order the notes of the group of concurrent notes according to pitch of each note, thereby creating a sequence of notes;
  - compute an interval between the two notes in each pair of adjacent notes of the sequence of notes using the pitch classes corresponding to each note of the pair;
  - in accordance with the pitch class corresponding to the bass note of the group of concurrent notes and the computed intervals, translate the group of concurrent notes into a computer input signal representative of one or more keystrokes on a computer keyboard; and
  - send the computer input signal through the one or more outputs to a computer for output or further processing.

8. The system as set forth in claim 7, wherein the microprocessor is configured to identify the group of concurrent notes by identifying note events having initiation within an adjustable duration.

9. The system as set forth in claim 7, wherein the microprocessor is further configured to determine cardinality of the group of concurrent notes.

10. The method as set forth in claim 9, wherein translating further comprises translating such that each group of concurrent notes with a cardinality of two notes having a particular interval computed therebetween are translated into a computer input signal representative of a keystroke from a particular row of the computer keyboard.

11. The system as set forth in claim 7, wherein the microprocessor is configured to translate in accordance with the velocity of one or more note events of the group of concurrent notes.

12. The system as set forth in claim 7, wherein the microprocessor is configured to translate by, for note events of the notes of the group of concurrent notes having velocity above an adjustable threshold, translating into a computer input signal representative of both a keystroke on the computer keyboard and activation of a modifier key on the computer keyboard.

13. A method for interfacing tones with a computer, comprising:
- with a microprocessor:
  - from a musical instrument, receiving an analog signal representing one or more tones each having a pitch and a volume;
  - identifying a group of concurrent tones of the one or more tones, wherein the group of concurrent tones includes a bass tone and each tone of the group of concurrent tones is a member of a pitch class corresponding with the pitch of the tone;
  - sequentially ordering the tones of the group of concurrent tones according to the pitch of each tone, thereby creating a sequence of tones wherein every two adjacent tones in the sequence constitutes a pair;
  - computing an interval between the two tones in each pair of adjacent tones of the sequence of tones using the pitch classes corresponding to each tone of the pair;
  - in accordance with the pitch class corresponding to the bass tone of the group of concurrent tones and the computed intervals, translating the group of concurrent tones into a computer input signal representative of one or more key strokes on a computer keyboard; and
  - sending the computer input signal to a computer for output or further processing.

14. The method as set forth in claim 13, wherein identifying the group of concurrent tones further comprises identifying tones occurring within an adjustable duration.

15. The method as set forth in claim 13, wherein translating further comprises translating in accordance with cardinality of the group of concurrent tones.

16. The method as set forth in claim 15, wherein translating further comprises translating such that each group of concurrent notes with a cardinality of two tones having a particular interval computed therebetween are translated into a computer input signal representative of a keystroke from a particular row of the computer keyboard.

17. The method as set forth in claim 13, wherein translating further comprises translating in accordance with the volume of one or more note events of the grouped of concurrent notes.

18. The method as set forth in claim 13, wherein translating further comprises, for note events of the grouped of concurrent notes having volume above an established threshold, translating into a computer input signal representative of both a keystroke on the computer keyboard and activation of a modifier key on the computer keyboard.

* * * * *